United States Patent [19]

Numazawa et al.

[11] Patent Number: 4,508,522
[45] Date of Patent: Apr. 2, 1985

[54] DOUBLE CARDAN UNIVERSAL JOINT

[75] Inventors: Akio Numazawa, Nagoya; Ichio Sakai, Toyota; Tadanobu Kumagai, Toyota; Seiichi Nishikawa, Toyota, all of Japan

[73] Assignee: Toyota Jidosha Kogyo Kabushiki Kaisha, Toyota, Japan

[21] Appl. No.: 478,815

[22] Filed: Mar. 30, 1983

Related U.S. Application Data

[63] Continuation of Ser. No. 109,221, Jan. 3, 1980, abandoned.

[30] Foreign Application Priority Data

Jan. 10, 1979 [JP] Japan ............... 54-1754[U]

[51] Int. Cl.³ .................................................. F16D 3/26
[52] U.S. Cl. ...................................... 464/11; 464/118
[58] Field of Search .................. 464/11, 14, 117, 118, 464/133; 137/854

[56] References Cited

U.S. PATENT DOCUMENTS

| | | | |
|---|---|---|---|
| 1,932,400 | 10/1933 | Fageol | 464/14 |
| 1,968,787 | 7/1934 | Slaght et al. | 464/133 X |
| 2,025,502 | 12/1935 | Fageol | 464/14 |
| 2,769,457 | 11/1956 | Wittenberg | 137/854 X |
| 3,120,746 | 2/1964 | Kayser | 464/11 X |
| 3,454,182 | 7/1969 | Morton | 137/854 X |
| 3,648,728 | 3/1972 | Perry et al. | 137/854 |
| 3,835,667 | 9/1974 | King et al. | 464/11 X |
| 3,858,412 | 1/1975 | Fisher et al. | 464/146 |
| 4,207,757 | 6/1980 | Onuma | 464/11 |

FOREIGN PATENT DOCUMENTS 1475963 7/1969 Fed. Rep. of Germany ...... 137/854

Primary Examiner—Stuart S. Levy
Assistant Examiner—Daniel P. Stodola
Attorney, Agent, or Firm—Oblon, Fisher, Spivak, McClelland & Maier

[57] ABSTRACT

An improvement in a double Cardan universal joint having a pair of spiders connected by a ring-shaped coupling member, a pair of yoke members angularly movably connected with each other by the spiders, a centering assembly for aligning the yoke members with each other and defining a reservoir for grease within a bridge forming a part of one of the yoke members and a breather hole formed in the bridge for making the reservoir communicate with the atmosphere. The improvement comprises a valve of elastic material inserted in the breather hole and capable of elastically blockading the communication of the reservoir with the atmosphere when internal pressure of the reservoir is below a predetermined amount and being elastically deformed to make the reservoir communicate with the atmosphere when the internal pressure reaches or exceeds the predetermined amount.

1 Claim, 6 Drawing Figures

DOUBLE CARDAN UNIVERSAL JOINT

This application is a continuation of application Ser. No. 109,221, filed Jan. 3, 1980, now abandoned.

BACKGROUND OF THE INVENTION

1. Field of the Invention

The present invention relates to a constant velocity universal joint which is applied to the axle shaft of an automobile of four-wheel drive type. In particular, it relates to a double Cardan universal joint.

2. Description of the Prior Art

In general, two yoke members of a double Cardan joint are connected with each other by a centering assembly. The centering assembly is necessarily exposed to continuous friction during transmission of torque. Therefore, the centering assembly generally has an inner space for containing grease therein for lubrication purpose and a breather hole for making the inner space communicate with the atmosphere. The breather hole is also adapted to adjust the internal pressure of the inner space by releasing air from the inner space into the atmosphere when the internal pressure is raised by injection of grease, angular motion of the centering assembly or temperature rise. An especially important function of the breather hole is to prevent deformation of the lip of a sealing member caused by impact pressure upon injection of the grease and displacement of the sealing member.

However, it has been apprehended that muddy water enters the inner space through the breather hole to deteriorate the grease and debase lubrication of the centering assembly depending on the condition under which the joint is used.

SUMMARY OF THE INVENTION

The object of the present invention is to overcome the aforementioned disadvantage of the prior art by providing a new and improved double Cardan universal joint which can properly adjust the internal pressure of an inner space containing grease and effectively prevent entry of muddy water into the space.

The double Cardan universal joint according to the present invention is provided with a valve member inserted in a breather hole communicating with the grease containing space. The valve member functions to adjust the internal pressure of the space by releasing air from the space when the internal pressure reaches or exceeds a predetermined amount, while ordinarily preventing entry of muddy water into the space from outside by blockading the breather hole. According to the present invention, therefore, injection of grease into the space can be conducted without hindrance and good lubrication of the centering assembly is maintained by preventing deterioration of the grease caused by entry of muddy water into the space.

BRIEF DESCRITPION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

Figure 1:
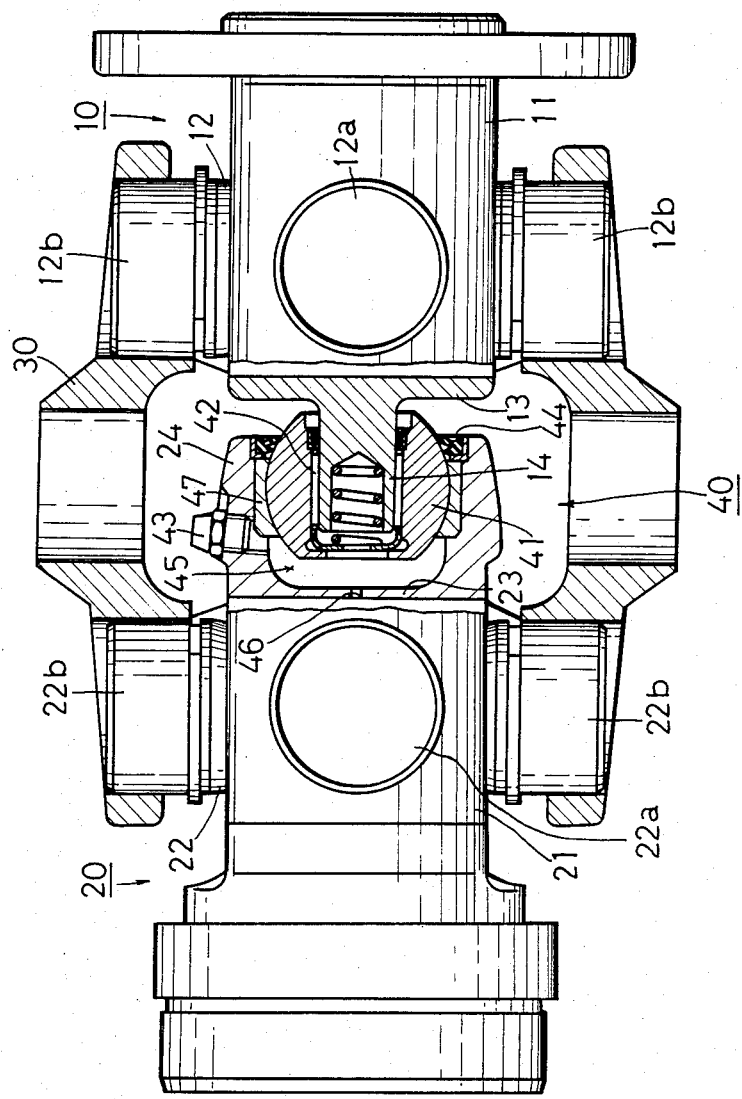
FIG. 1 is a partially fragmentary top plan view of the double Cardan universal joint according to the present invention.

Referring now to FIG. 1 of the drawings in which a double Cardan universal joint according to the present invention is shown, numeral 10 indicates a first joint cross assembly and numeral 20 indicates a second joint cross assembly. The first and the second joint cross assemblies 10 and 20 include spiders 12 and 22 and yoke members 11 and 21 which are angularly movably connected to a pair of trunnions 12a and 22a of the spiders 12 and 22 respectively. Another pair of trunnions 12b and 22b of the spiders 12 and 22 are connected with each other by a ring-shaped coupling member 30.

A centering assembly 40 is provided between the yoke members 11 and 12 of the two joint cross assemblies 10 and 20. Namely, the yoke members 11 and 12 are provided with bridges 13 and 23 respectively, and the bridge 13 of the yoke member 11 of the first joint cross assembly 10 is integrally formed with a cylindrical stem 14. The stem 14 supports a ball member 41 through a needle roller 42 so that the ball member 41 is rotatable and movable in the axial direction. The bridge 23 of the yoke member 21 of the second joint cross assembly 20 is integrally formed with a socket 24 which receives the ball member 41 through an inner member 47. The centering assembly 40 thus constructed aligns the yoke members 11 and 21 of the joint cross assemblies 10 and 20 with each other so that the joint cross assemblies 10 and 20 function as constant velocity joints.

A sealing member 44 is provided within the open end of the socket 24 to seal the space between the socket 24 and the outer periphery of the ball member 41 in an oil-tight manner.

An inner space of the socket 24 functions as a reservoir 45 for grease injected from a grease fitting 43 mounted to the socket 24. Further, a breather hole 46 is formed in the bridge 23 having the socket 24 so that the reservoir 45 communicates with the atmosphere. As hereinabove described, the breather hole 46 is in general adapted to adjust the internal pressure of the reservoir 45 by releasing the air inside the reservoir 45 into the atmosphere when the internal pressure thereof becomes high.

Figure 2:
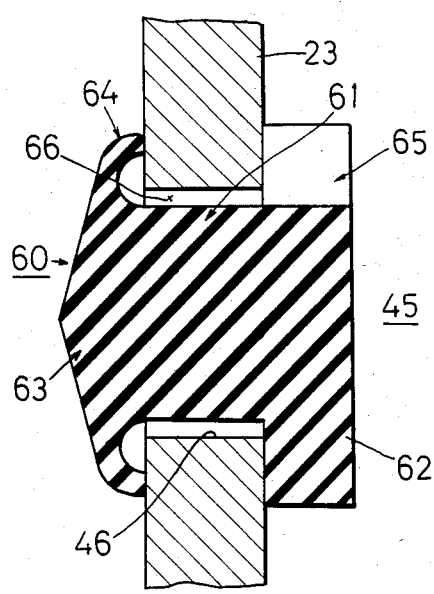
FIG. 2 is an enlarged cross sectional view of a valve member inserted in the breather hole.
Figure 3:
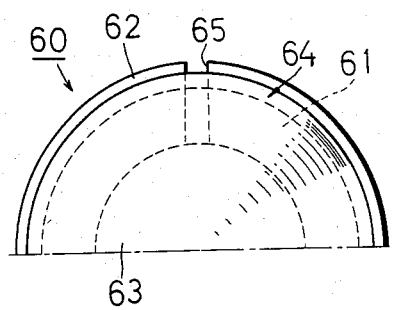
FIG. 3 is a side elevational view of a half of the valve member as viewed from the top side.
Figure 4:
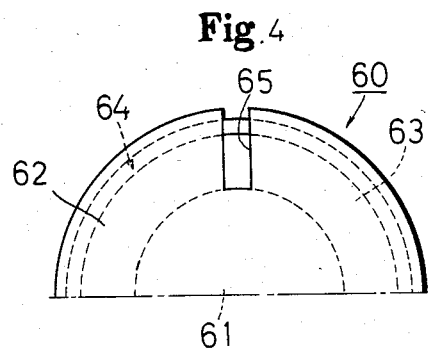
FIG. 4 is a side elevational view of a half of the valve member as viewed from the base side.

As shown in FIGS. 2 to 4, a valve member 60 is inserted in the breather hole 46. The valve member 60 is a one-piece member made of elastic material such as rubber, and includes a cylindrical, solid stem 61, a circular base portion 62 integrally provided with one end of the stem 61 and a conical top portion 63 integrally provided with the other end of the stem 61. The valve member 60 is inserted into the breather hole 46 from the interior of the bridge 23 previous to assembling of the centering assembly 40 so that the conical top portion 63 is located outside the bridge 23. In this condition, the base portion 62 of the valve member 60 is positioned inside the bridge 23, and the distance between the base portion 62 and the top portion 63 is sized to be smaller than the thickness of the bridge 23. Therefore, the relatively thin rim of the top portion 63 is resiliently pressed against the outer surface of the bridge 23 with a certain interference. The rim of the top portion 63 functions as a pressured movable portion 64 as hereinafter described.

As shown in FIG. 2, the outer diameter of the stem 61 is sized to be smaller than the inner diameter of the breather hole 46 to define a generally semicircularly shaped void in cross section that connects with clearance 66 which communicates with the interior of the top portion 63 between the outer periphery of the stem 61 and the inner periphery of the breather hole 46. Further, the base portion 62 is provided with one or two slits 65 in its circumferential direction so as to communicate with the clearance 66. Namely, the reservoir 45 in the socket 24 communicates with the interior of the pressured movable portion 64 of the top portion 63 through the slit 65 and the clearance 66.

When the grease is injected into the reservoir 45 through the grease fitting 43 by an appropriate mechanism such as a grease injecting gun on condition that the breather hole 46 is not provided in the bridge 23, impact pressure of not lower than 50 to 60 atm might be built up in the reservoir 45. However, since the internal pressure of the reservoir 45 continuously acts upon the pressured movable portion 64 of the top portion 63 through the slit 65 and the clearance 66 in the embodiment of the present invention, the pressured movable portion 64 is resiliently deformed outwardly by pressure to open the breather hole 46 when the internal pressure reaches or exceeds a predetermined amount. Consequently, the air in the reservoir 45 is released, and the internal pressure of the reservoir 45 is appropriately adjusted. In general, the pressured movable portion 64 is pressed against the outer surface of the bridge 23 to prevent entry of muddy water into the reservoir 45.

The amount of the pressure under which the pressured movable portion 64 of the valve member 60 works to release the air in the reservoir 45 can be freely determined depending on the material of the valve member 60, the number and the width of the slit 65 and the size of the interference of the pressured movable portion 64. Therefore, the pressured movable portion 64 functions to adjust the internal pressure of the reservoir 45 also in case the internal pressure is raised following angular motion of the centering assembly 40 and temperature rise.

Figure 5:
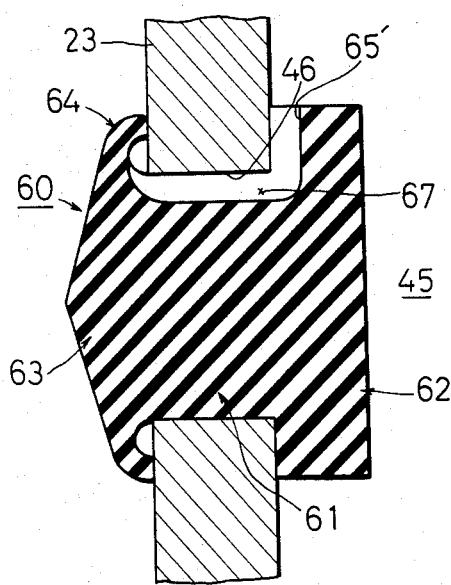
FIGS. 5 and 6 are cross sectional views similar to FIG. 2 showing other embodiments of the valve member.

FIG. 5 shows a second embodiment of the present invention in which a groove 67 communicating with the pressured movable portion 64 is formed in the outer periphery of the stem 61 of the valve member 60 to substitute for the clearance 66, and a slit 65' is formed in the base portion 62 to communicate with the groove 67. The other portions of this embodiment are constructed identically with those of the first embodiment as shown in FIGS. 2 to 4.

Figure 6:
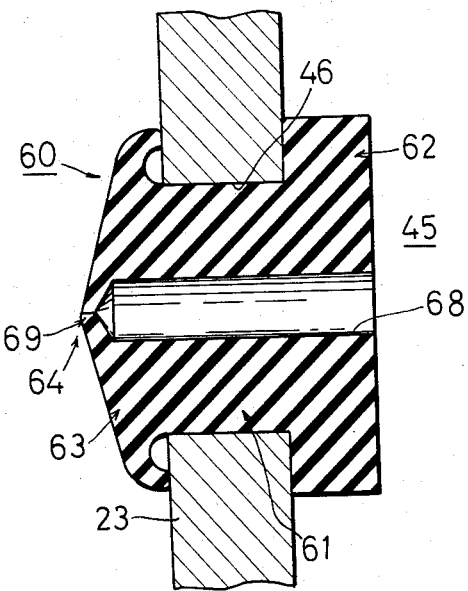

FIG. 6 shows a third embodiment of the present invention. In this embodiment, the valve member 60 has in its center a hole 68 which is terminated slightly inwardly of the top portion 63 which, in turn, has a slit 69 in the form of, for example, a cross communicating with the hole 68. Namely, the internal pressure of the reservoir 45 containing the grease acts on the periphery of the slit 69. Therefore, when the internal pressure of the reservoir 45 is raised, the periphery of the slit 69 is opened to release the air into the atmosphere. In this embodiment, thus, the periphery of the slit 69 functions as the pressured movable portion.

While the invention has been described with reference to a few preferred embodiments thereof, it is to be understood that modifications or variations may be easily made without departing from the scope of this invention which is defined by the appended claims.

What is claimed is:

1. A valve for a double Cardan universal joint having a pair of spiders connected by a ring-shaped coupling member, a pair of yoke members angularly movably connected with each other by said spiders, a centering assembly for aligning said yoke members with each other and defining a reservoir for grease within a bridge forming a part of one of said yoke members and a breather hole formed in said bridge for allowing said reservoir to communicate with atmosphere, comprising:

an elastic one-piece valve member disposed in said breather hole, said valve member having a pressured movable portion for elastically blockading said communication of said reservoir with the atmosphere when internal pressure of said reservoir is below a predetermined amount and for being elastically deformed to allow said reservoir to communicate with the atmosphere when said internal pressure reaches or exceeds said predetermined amount wherein said valve member further comprises a stem solid throughout its entire cross-section inserted in said breather hole to define an annular clearance therebetween, a base portion connected to a first end of said stem to closely contact with the inner surface of said bridge and a conical top portions having a semicircularly shaped void in cross section formed therein in communication with said annular clearance, said conical top portion being of a thickness which is smaller than that of said bridge and connected to a second end of said stem to define a ring-shaped clearance between the inner surface thereof and the outer surface of said bridge communicating with said annular clearance, said pressured movable portion forming the outer periphery of said top portion to enclose said ring-shaped clearance and said semicircularly shaped void, wherein said base portion further comprises means for allowing said clearance defined within said breather hole to communicate with said reservoir, and wherein said means for allowing said clearance to communicate with said reservoir further comprises not greater than a first and second slit provided in said base portion from a radially outer surface thereof.

* * * * *